United States Patent
Fujita et al.

(10) Patent No.: US 6,735,713 B1
(45) Date of Patent: May 11, 2004

(54) SYSTEM FOR SUSPENDING CURRENT BUS CYCLE OF MICROPROCESSOR UPON RECEIVING EXTERNAL BUS RETRY SIGNAL FOR EXECUTING OTHER PROCESS AND RE-STARING THE SUSPENDED BUS CYCLE THEREAFTER

(75) Inventors: Norio Fujita, Shiga-ken (JP); Mashahiro Murakami, Kyoto (JP); Yoshifumi Sakamoto, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,544

(22) Filed: Mar. 9, 2000

(30) Foreign Application Priority Data

Mar. 9, 1999 (JP) ............................. 11-062049

(51) Int. Cl.⁷ ................................................ G06F 1/04
(52) U.S. Cl. ...................................... 713/600; 710/107
(58) Field of Search .................. 713/600, 500, 713/323, 322; 710/305, 107, 52, 37, 260, 240; 379/69

(56) References Cited

U.S. PATENT DOCUMENTS

| | | | | |
|---|---|---|---|---|
| 4,602,327 A | * | 7/1986 | LaViolette et al. | 710/107 |
| 4,819,158 A | * | 4/1989 | Miyashita | 710/305 |
| 4,907,150 A | * | 3/1990 | Arroyo et al. | 713/323 |
| 5,109,492 A | * | 4/1992 | Noguchi et al. | 713/600 |
| 5,150,467 A | * | 9/1992 | Hayes et al. | 710/107 |
| 5,471,625 A | * | 11/1995 | Mussemann et al. | 713/322 |
| 5,533,103 A | * | 7/1996 | Peavey et al. | 379/69 |
| 5,581,745 A | * | 12/1996 | Muraoka et al. | 713/502 |
| 5,742,849 A | * | 4/1998 | Nakamura | 710/52 |
| 5,862,353 A | * | 1/1999 | Revilla et al. | 710/107 |
| 6,104,876 A | * | 8/2000 | Daum et al. | 710/37 |

FOREIGN PATENT DOCUMENTS

| | | |
|---|---|---|
| JP | 63-118947 | 5/1988 |
| JP | 4-264654 | 9/1992 |
| JP | 5-265882 | 10/1993 |
| JP | 7-230413 | 8/1995 |

* cited by examiner

*Primary Examiner*—Thomas Lee
*Assistant Examiner*—Thuan Du
(74) *Attorney, Agent, or Firm*—Scully, Scott, Murphy & Presser; Derek S. Jennings

(57) ABSTRACT

The present invention is directed to a microprocessor (MPU) 10 comprising a bridge chip 12 including a bus retry output part (40) for outputting a bus retry (BRTY) signal; a bus retry detection part (30) for determining whether a bus retry signal is input from the bridge chip 12; and a bus cycle controller (38) for suspending a currently executed bus cycle in response to detection of the bus retry signal and for re-starting the suspended bus cycle. The bridge chip also preferably includes an interrupt detection part (32) for determining whether another process request is issued during suspension of the bus cycle; and an interrupt controller (38) for executing that other process before re-starting the suspended bus cycle.

12 Claims, 10 Drawing Sheets

F I G. 1 0
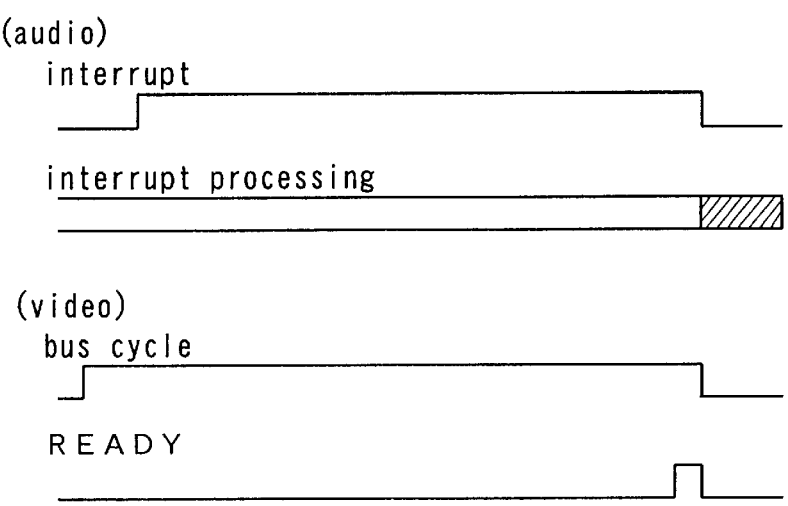

SYSTEM FOR SUSPENDING CURRENT BUS CYCLE OF MICROPROCESSOR UPON RECEIVING EXTERNAL BUS RETRY SIGNAL FOR EXECUTING OTHER PROCESS AND RE-STARING THE SUSPENDED BUS CYCLE THEREAFTER

BACKGROUND OF THE INVENTION

1. Technical Field

The present invention relates to a microprocessor, a system including a microprocessor and a method of controlling a bus cycle of a microprocessor. More particularly, it relates to control of a bus cycle and a process of another process request issued while the bus cycle is being executed by the microprocessor.

2. Prior Art

An example of a system including a microprocessor is shown in FIG. 7. FIG. 7 is a block diagram for showing an example of a connection between a microprocessor unit (MPU) 80 and other devices 84, 86 and 88 in a personal computer. The MPU 80 is connected to a bridge chip 82 through a local bus. The local bus is connected to a bus interface unit (BIU) 90 inside the MPU 80 as shown in FIG. 8. The bridge chip 82 executes the mutual conversion between the bus connected with the MPU 80 and buses connected with the other devices 84, 86 and 88. The device 84 connected with the bridge chip 82 through an accelerated graphics port (AGP) bus is a video chip. The video chip 84 is a device for executing the image processing. The device 88 connected with the bridge chip 82 through a memory bus is a memory (storage device). Furthermore, the device 86 connected with the bridge chip 82 through a peripheral component interconnect (PCI) bus is an audio chip. The audio chip 86 is a device for executing the audio processing.

Now, a bus cycle and an interrupt process will be described by exemplifying a case where another process request (hereinafter referred to as an interrupt request) is issued from the audio chip 86 during the execution of a bus cycle for the video chip 84. FIG. 8 shows a flow of signals supplied in the exemplified case (including the bus cycle, a READY signal, an interrupt signal and a bus cycle for the interrupt processing). FIG. 9 is a flowchart for showing procedures in the bus cycle and the interrupt processing. FIG. 10 is a timing chart for showing the signals used in this case (including the bus cycle, the READY signal and the interrupt signal) and an operating status of the interrupt processing. The READY signal used herein is a signal output by a device having received a bus cycle to inform the MPU that the bus cycle can be completed because the requested instruction has been understood or the requested process has been completed. Therefore, when the READY signal is returned, the MPU generates a bus cycle for requesting a subsequent process. Furthermore, it is herein assumed that the process of the audio chip 86 takes priority over that of the video chip 84.

First, the MPU 80 generates a bus cycle for the video chip 84 (S102). Assuming that the image processing of the video chip takes a long period of time, the MPU 80 continuously executes the current bus cycle until the READY signal is returned from the video chip 84 (S104). At this point, the local bus is occupied by the process of the video chip 84. Therefore, as is shown in FIG. 10, when an interrupt request is received from the audio chip 86 during the execution of the bus cycle for the video chip 84, the MPU 80 cannot execute the process requested by the audio chip 86. Accordingly, when the video chip 84 is placed in a ready condition and the READY signal is returned, the bus cycle for the video chip 84 is completed (S106), and the local bus is released. After that, since the interrupt request has been issued by the audio chip 86 (S112); the MPU 80 generates a bus cycle for the audio chip 86 so as to execute the interrupt processing (S114).

When the image processing takes a long period of time in this manner, the process request from the audio chip 86 should be waited until the READY signal is returned from the video chip 84. Since the process of the audio chip 86 lags behind a timing for outputting sound due to this waiting time, it causes the sound to be out of rhythm and a note to be skipped, thus causing various problems. Specifically, in the conventional microprocessor unit 80, even when a process request with high priority is received while waiting for a READY signal, the requested process should be waited until the currently executed bus cycle is completed.

As a method to be adopted in such a case where the process of a device receiving a bus cycle takes a long period of time and a READY signal takes a long time to be returned, a forced termination method or a method of gradually executing a target process is adopted. In the forced termination method, a timer of hardware is used so that the bus cycle can be forcedly terminated when a READY signal is not returned in a predetermined period of time, the microprocessor is informed of a bus time-out error, and the error is processed by using a system program. In this method, however, it is necessary to terminate the currently executed process, and the error processing increases the burden of the software. Alternatively, in the method of gradually executing a target process, accesses to hardware, which require a long waiting time, are not made in a batch, but the process is gradually executed while it is confirmed by the software processing whether the device is in a ready state or not. Also in this method, however, burden of the software is increased, and additionally, the processing speed is decreased because the target process is gradually executed.

An object of the present invention is, in the case where another process request is issued while a microprocessor has issued a bus cycle but a READY signal is not returned for a long period of time, to suspend a currently executed bus cycle so as to priorly execute the requested process.

SUMMARY OF THE INVENTION

The microprocessor of the present invention comprises a bus retry detection part for determining whether or not a bus retry signal is externally input and a bus cycle controller for suspending a currently executed bus cycle in response to the bus retry signal detected by said bus retry detection part and for re-starting the suspended bus cycle.

The system including a microprocessor of the present invention comprises a bus retry output device for outputting a bus retry signal and a microprocessor including a bus retry detection part for determining whether or not a bus retry signal is input from the bus retry output device and a bus cycle controller for suspending a currently executed bus cycle in response to the bus retry signal detected by the bus retry detection part and for re-starting the suspended bus cycle.

The method of controlling a bus cycle of a microprocessor of the present invention comprises a bus retry output step of outputting a bus retry signal to a microprocessor and a re-starting step of suspending a bus cycle currently executed by the microprocessor in response to the bus retry signal input to the microprocessor and then re-starting the suspended bus cycle.

BRIEF DESCRIPTION OF THE DRAWINGS

Preferred embodiments of the present invention will now be described, by way of example only, with reference to the accompanying drawings in which:

FIG. 10 is a timing chart for showing signals related to the us cycle and the interrupt processing and a state of the interrupt processing in the system including the microprocessor of FIG. 8.

DETAILED DESCRIPTION OF THE PREFERRED EMBODIMENTS OF THE INVENTION

Figure 1:
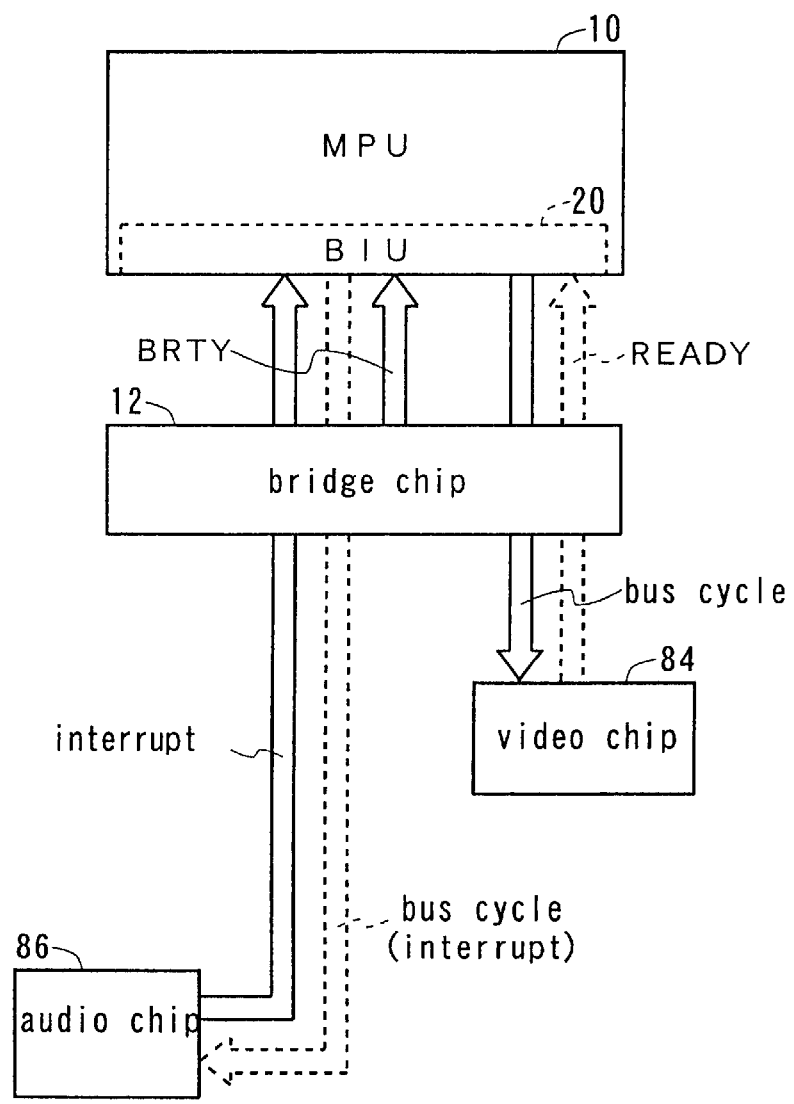
FIG. 1 is a block diagram for illustrating a flow of signals related to a bus cycle and an interrupt processing in a system including a microprocessor (MPU) according to the present invention.
Figure 7:
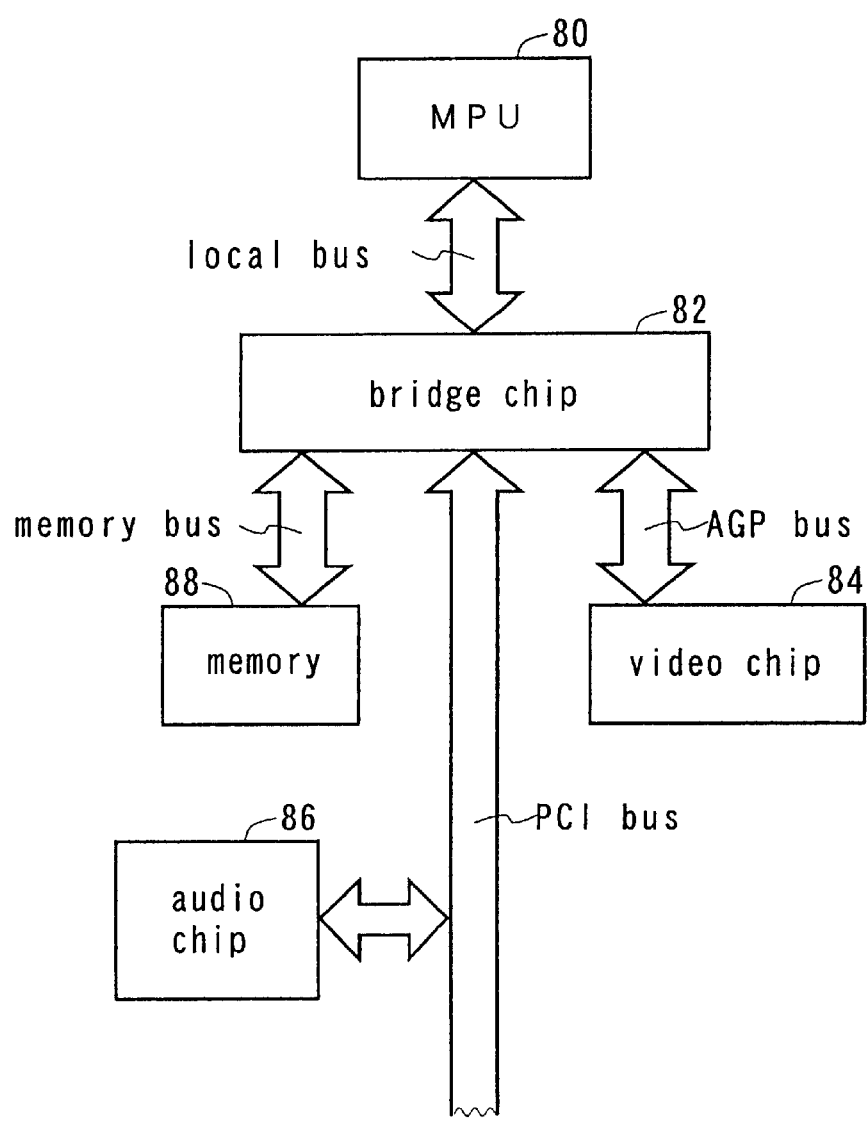
FIG. 7 is a block diagram for showing an example of a connection between a conventional microprocessor (MPU) and other devices.
Figure 8:
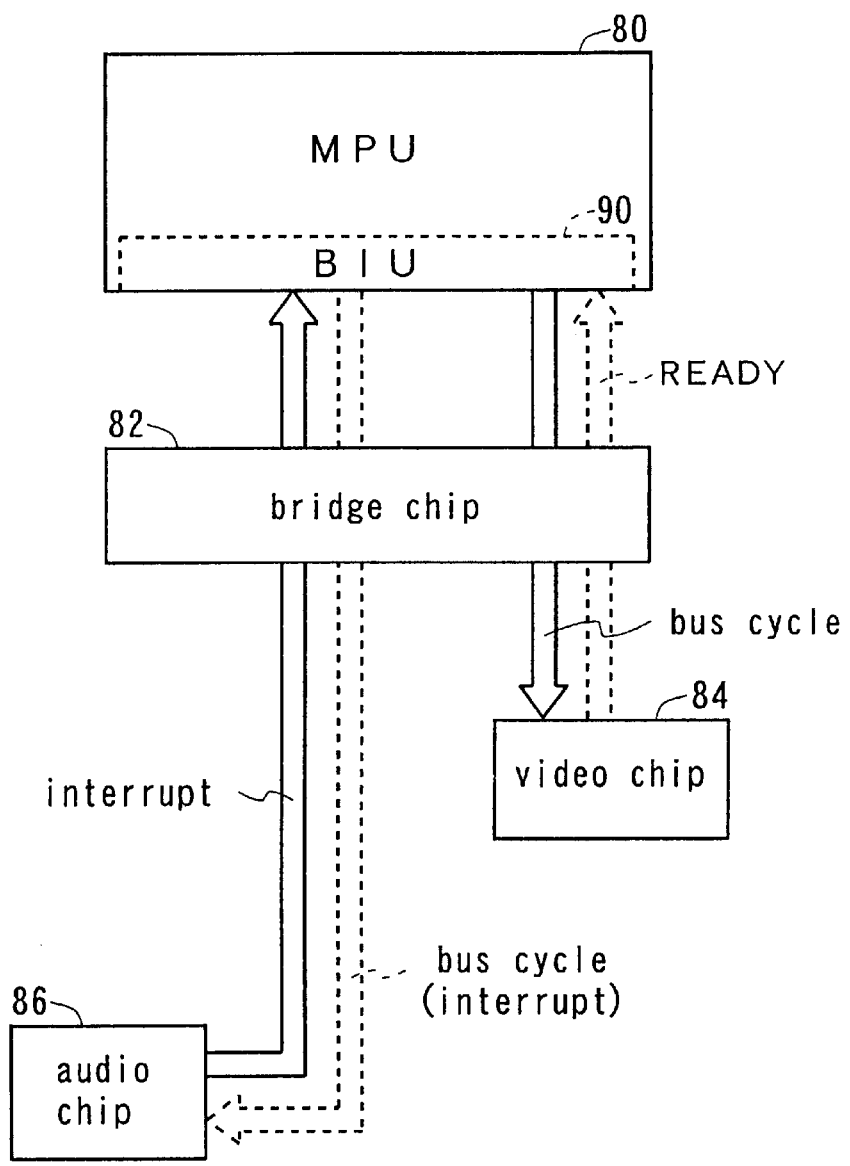
FIG. 8 is a block diagram for illustrating a flow of signals related to a bus cycle and an interrupt processing in a system including the microprocessor of FIG. 7.
Figure 9:
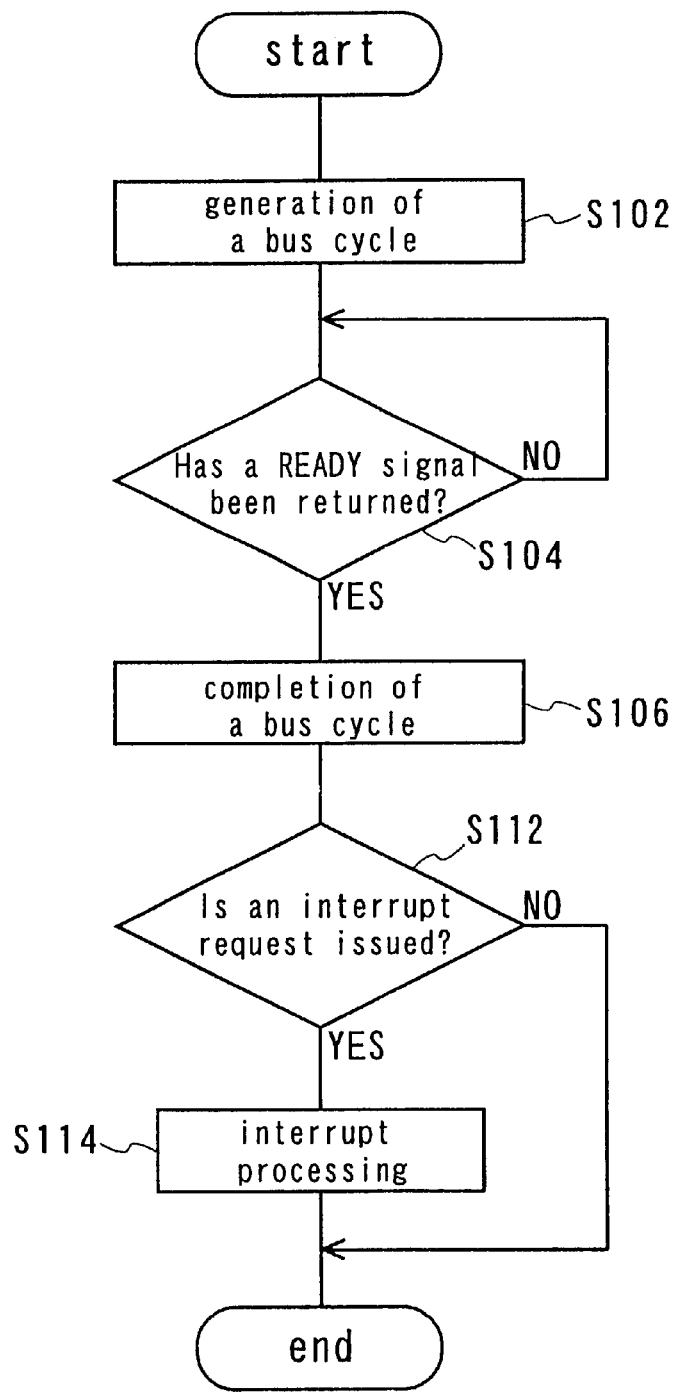
FIG. 9 is a flowchart for showing an example of procedures in the bus cycle and the interrupt processing in the system including the microprocessor of FIG. 8.

Referring now to the accompanying drawings, a preferred embodiment of a system including a microprocessor and a method of controlling a bus cycle according to the present invention will be described in detail. In this embodiment, a personal computer similar to that shown in FIG. 7 will be exemplified. FIG. 1 shows the system including the microprocessor of the present invention, wherein a bus retry (BRTY) signal output from a bridge chip 12 is input to an MPU (microprocessor unit) 10. In other words, the system additionally includes a BRTY signal line in the local bus.

Figure 2:
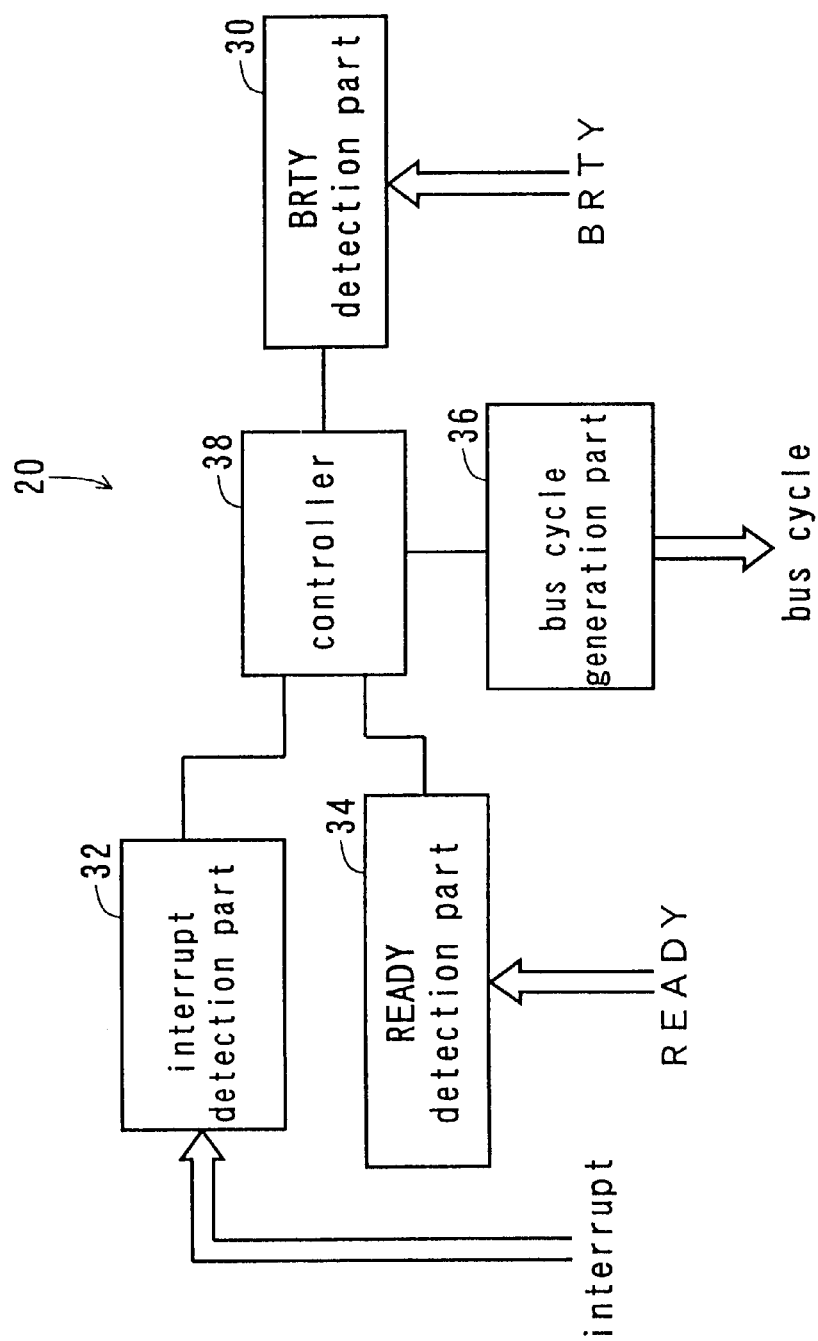
FIG. 2 is a schematic block diagram for showing the structure of a part related to the present invention in a BIU of the microprocessor of FIG. 1.

FIG. 2 is a schematic block diagram for showing the structure of a part relating to the present invention in a BIU (bus interface unit) 20 included in the MPU 10. The BIU 20 includes a BRTY detection part 30 for determining whether or not a BRTY signal is externally input to the MPU 10. The BIU 20 further includes an interrupt detection part 32 for determining whether or not an interrupt signal is input, a READY detection part 34 for determining whether or not a READY signal is input, and a bus cycle generation part 36 for generating a bus cycle. The BRTY detection part 30, the interrupt detection part 32, the READY detection part 34 and the bus cycle generation part 36 are connected to a controller 38. The bus cycle generation part 36, the READY detection part 34 and the interrupt detection part 32 can be the same as those used in the conventional system.

The BRTY detection part 30, the interrupt detection part 32, the READY detection part 34 and the bus cycle generation part 36 are controlled by the controller 38, so that a currently executed bus cycle can be suspended in response to input of a BRTY signal. While the bus cycle is suspended, it is checked whether or not an interrupt signal is input. When an interrupt request is detected, the process requested by the interrupt signal is executed before re-starting the suspended bus cycle. When no interrupt request is detected, the suspended bus cycle is re-started.

Figure 3:
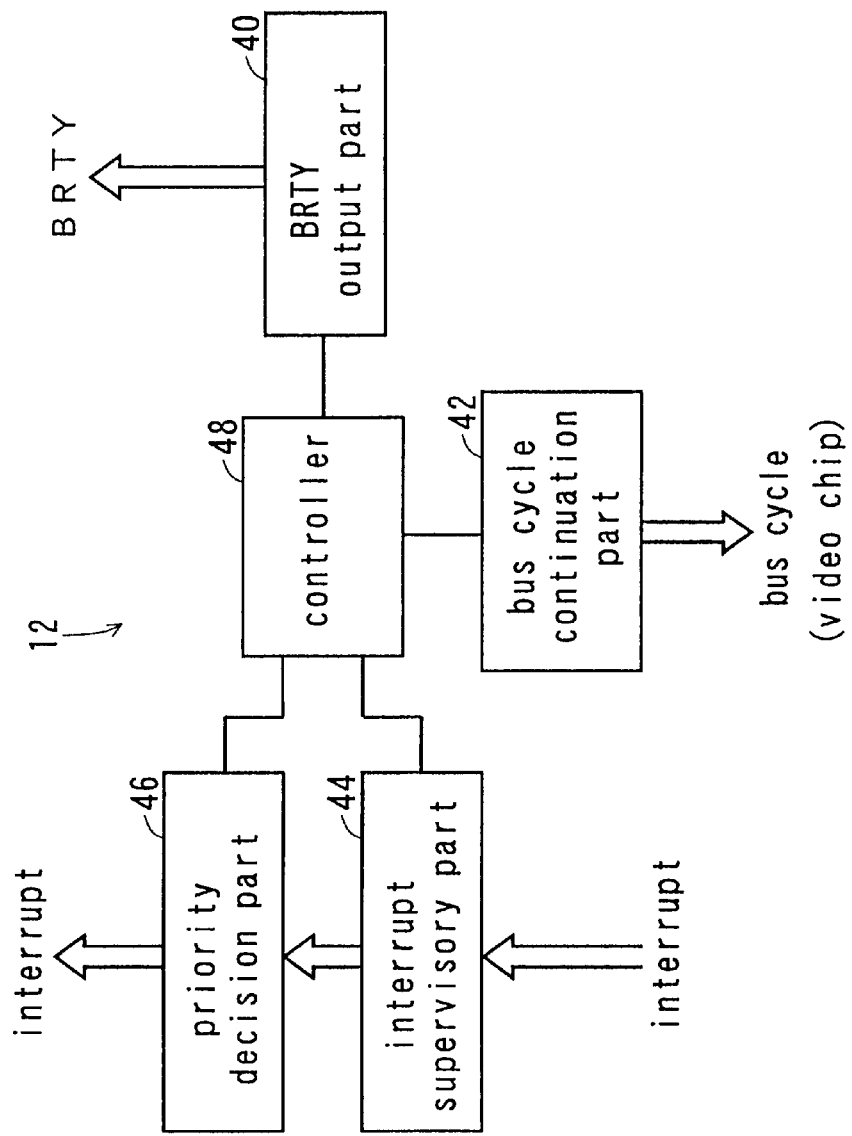
FIG. 3 is a schematic block diagram for showing the structure of a part related to the present invention in a bridge chip of the system including the microprocessor of FIG. 1.

FIG. 3 is a schematic block diagram for showing the structure of a part relating to the present invention in a bridge chip 12, and the bridge chip 12 includes a BRTY output part 40 for outputting a BRTY signal. The bridge chip 12 still further includes an interrupt supervisory part 44 for supervising an interrupt request, and a priority decision part 46 for comparing the priority of an interrupt process and the priority of a currently executed bus cycle. Although not shown in FIG. 3, the bridge chip 12 further includes a bus cycle supervisory part for supervising the currently executed bus cycle to compare the priority of the current executed bus cycle with the priority of the interrupt process. The BRTY output part 40, the interrupt supervisory part 44 and the priority decision part 46 are controlled by a controller 48. Specifically, when an interrupt request is issued, the priorities of the interrupt request and the currently executed bus cycle are compared with each other, and when the priority of the interrupt request is higher, a BRTY signal is output.

Figure 5:
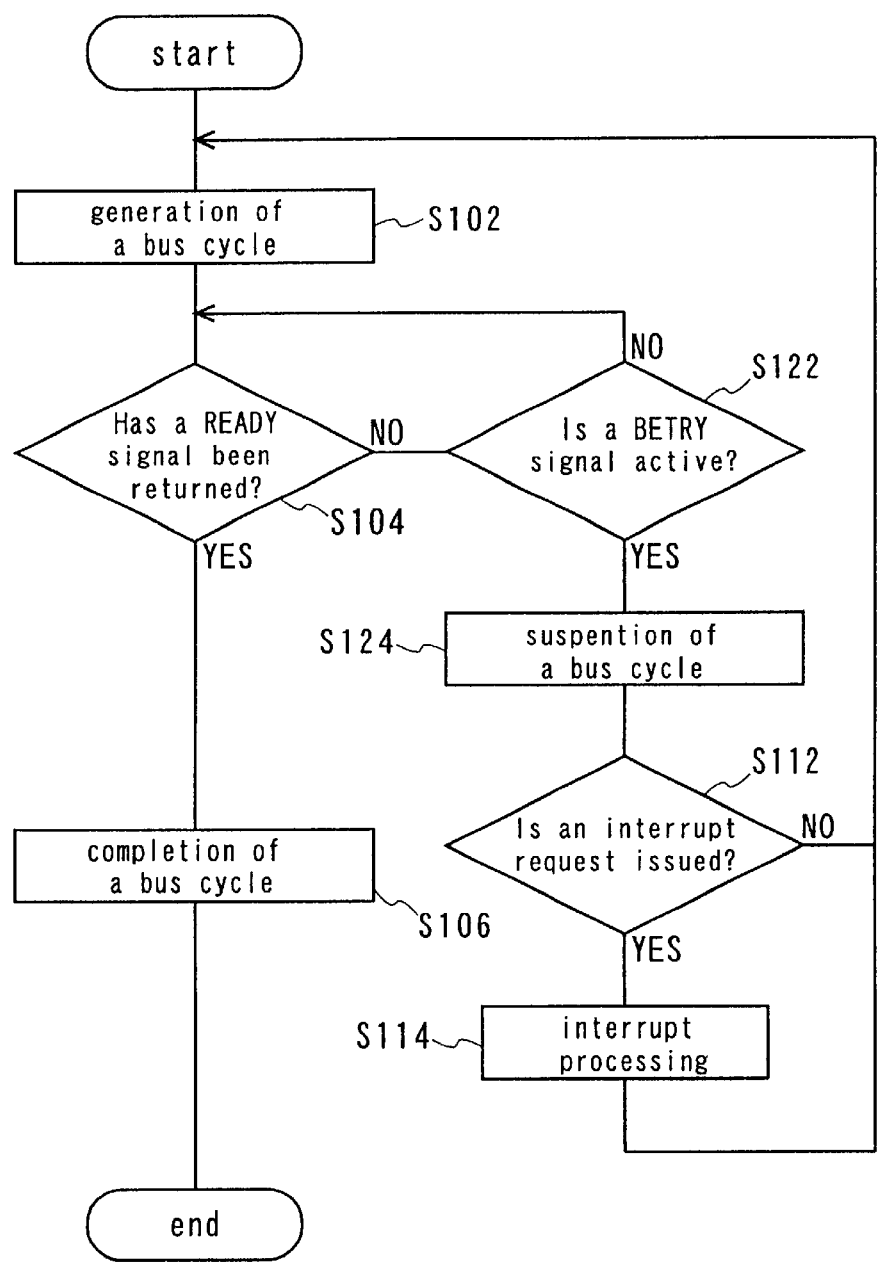
FIG. 5 is a flowchart for showing an example of procedures the bus cycle and the interrupt processing in the system including the microprocessor of FIG. 1.
Figure 6:
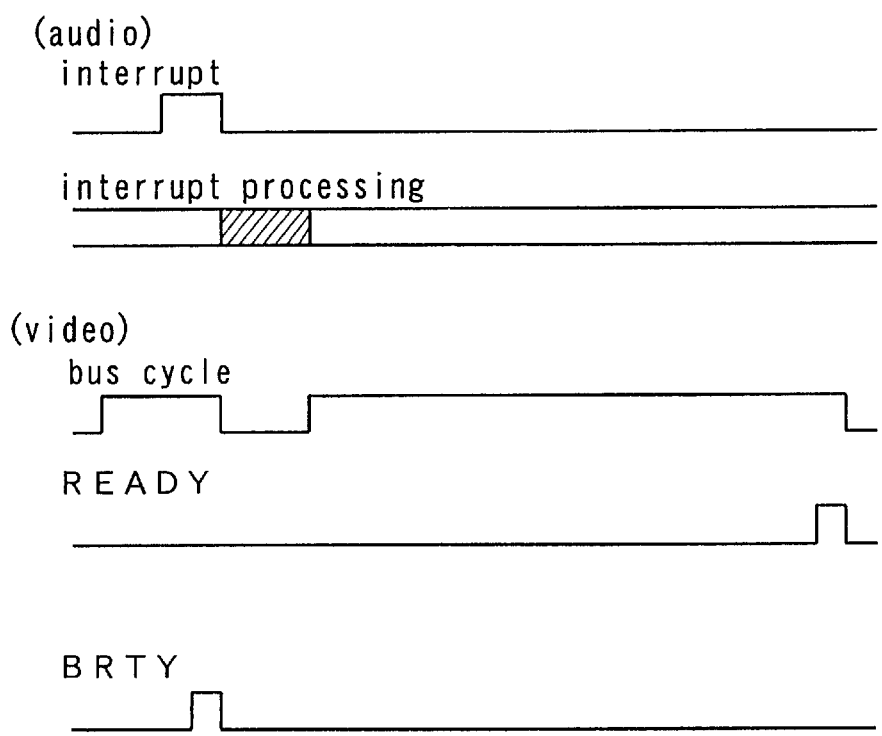
FIG. 6 is a timing chart for showing signals related to the bus cycle and the interrupt processing and a state of the interrupt processing in the system including the microprocessor of FIG. 1.

Next, a bus cycle and an interrupt processes in this MPU (microprocessor unit) 10 will be described below. In this embodiment, a case where an interrupt request having higher priority is issued from the audio chip 86 while a bus cycle has been generated for the video chip 84 and a READY signal is being waited to be returned is taken as an example. FIG. 5 is a flowchart for showing an example of procedures in the bus cycle and the interrupt process to be conducted in this case. FIG. 6 is a timing chart for showing signals used in this case (including an interrupt signal, a bus cycle, a READY signal and a BRTY signal) and a state of the interrupt process.

First, a bus cycle is generated for the video chip 84 (S102). When a READY signal is not returned from the video chip 84 and a BRTY signal is not input, the MPU 10 keeps on waiting for the READY signal to be returned (S104 and S122). In this case, the local bus is occupied by the process of the video chip 84.

Under this condition, when an interrupt request is issued by the audio chip 86, the bridge chip 12 compares the priority of the interrupt request issued by the audio chip 86 with the priority of the bus cycle for the video chip 84. In this embodiment, the interrupt request from the audio chip 86 takes priority over the bus cycle, and hence, the bridge chip 12 outputs the BRTY signal.

When the BRTY signal is input, the MPU 10 suspends the currently executed bus cycle (S124). As a result, the local bus is released. After suspending the bus cycle, the MPU 10 checks whether or not an interrupt request has been issued (S112). When an interrupt request is detected, the interrupt process is executed before re-starting the suspended bus cycle (S114). In this embodiment, since the interrupt request has been issued from the audio chip 86, the process of the audio chip 86 is priorly executed. When the interrupt process is completed, the suspended bus cycle for the video chip 84 is re-started (S102). After that, when the READY signal is returned from the video chip 84, the bus cycle is completed (S106).

In this manner, in the MPU 10 of the present invention, even when an interrupt request with higher priority is issued from the audio chip 86 while a READY signal is being waited to be returned from the video chip 84, the interrupt process of the audio chip 86 can be executed by suspending the bus cycle for the video ship 84. Accordingly, the audio processing cannot be delayed due to the influence of the processing time of the video chip 84, so that the conventional problems of skipped notes and sound out of rhythm can be prevented. In addition, such processes can be conducted by using hardware alone, and hence they can be executed rapidly and definitely.

Figure 4:
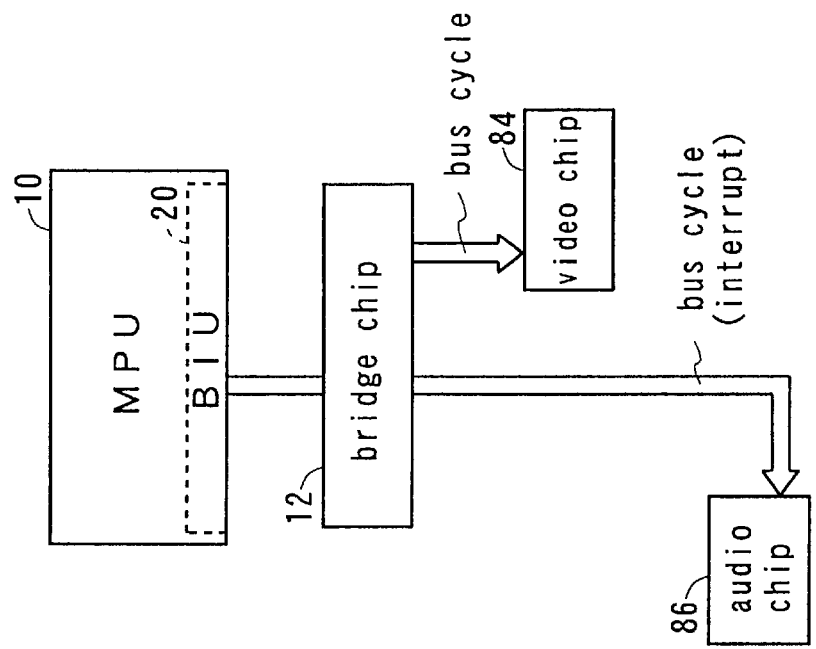
FIGS. 4(a) and 4(b) are block diagrams for illustrating a flow of a bus cycle realized by a bus cycle continuation part of the bridge chip of FIG. 3.
Figure 4:
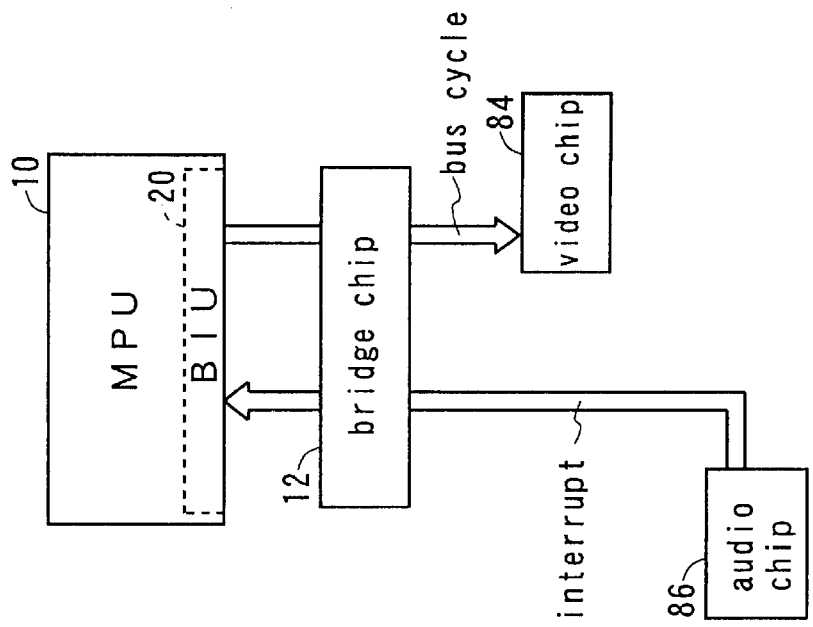

As is shown in FIG. 3, the bridge chip 12 includes a bus cycle continuation part 42 for continuously generating a bus cycle for the video chip 84 even when the MPU 10 is executing the interrupt process of the audio chip 86. Therefore, even when the bus cycle for the video chip 84 shown in FIG. 4(*a*) is suspended and a bus cycle for the audio chip 86 as shown in FIG. 4(*b*) is generated by the MPU 10, the bus cycle for the video chip 84 is continuously executed by the bus cycle continuation part 42. Since the bus cycle shown in FIG. 4(*a*), which is similar to the conventional bus cycle, can be continuously generated for the video chip 84 by using the bus cycle continuation part 42, there is no need to change or modify the video chip 84.

In this manner, since the microprocessor is provided with a function to suspend a bus cycle in response to an externally input BRTY signal and to re-start the suspended bus cycle, another process can be priorly conducted by suspending a currently executed bus cycle. Also, when a process request with higher priority than a currently executed bus cycle is issued, a BRTY signal is output so that the currently executed bus cycle can be suspended and the requested process with higher priority can be executed priorly.

Having described a preferred embodiment of the present invention, the microprocessor and the method of controlling a bus cycle of the microprocessor according to the present invention can also be materialized in the other embodiments. For example, the microprocessor and the method of controlling a bus cycle of the microprocessor of this invention are applicable not only to a personal computer but also to an arbitrary system including a microprocessor. Also, in the microprocessor and the method of controlling a bus cycle of the microprocessor of this invention, a currently executed bus cycle is suspended in response to a BRTY signal and the suspended bus cycle is re-started after another process is completed. Therefore, the audio processing described above can be replaced with, for example, a process of data input from a mouse or a keyboard.

Furthermore, the device for outputting a BRTY signal is not limited to the bridge chip but can be any device external to the microprocessor. However, since it is necessary to compare a currently executed bus cycle and an interrupt request so as to determine whether or not the currently executed bus cycle should be or can be suspended, a device capable of supervising the bus of the microprocessor is used.

The microprocessor and the method of controlling a bus cycle of the microprocessor of the present invention are variously described with reference to the accompanying drawings, but the present invention is not limited to those shown in the drawings. For example, an interrupt process can also be executed in the case of making an access to equipment whose power source is not on. According to the present invention, when a READY signal is not returned because the power source is not on, another process can be executed or an interrupt process for turning the power supply on can be executed. Furthermore, the present invention is applicable to control of a data-fetch request in a receiver for CS (communication satellite) broadcast. Since data are unilaterally transferred in the CS broadcast, failure in fetching data becomes a fatal error. However, according to the present invention, a request for fetching data can be executed with the highest priority.

While the invention has been particularly shown and described with respect to preferred embodiments thereof, it will be understood by those skilled in the art that the foregoing and other changes in form and details may be made therein without departing form the spirit and scope of the invention.

What is claimed is:

1. A microprocessor compressing:
    a bus retry detection part for determining whether or not a bus retry signal is externally input;
    a bus cycle controller for suspending a currently executed bus cycle in response to the bus retry signal detected by said bus retry detection part, while retaining control of the bus cycle, and for re-starting the suspended bus cycle; and
    an interrupt detection part for determining whether or not another process request is issued during suspension of the bus cycle.

2. The microprocessor according to claim 1, further comprising:
    an interrupt controller for executing said another process detected by said interrupt detection part before re-starting the suspended bus cycle.

3. A microprocessor according to claim 1, wherein said another process has a priority and the currently executed bus cycle has a priority, and wherein:
    the interrupt detection part compares the priority of said another process with the priority of the currently executed bus cycle, and generates the bus retry signal when the priority of the another process is higher than the priority of the currently executed bus cycle.

4. A system comprising:
    a bus retry output device for outputting a bus retry signal; and
    a microprocessor including a bus retry detection part for determining whether or not a bus retry signal is input from said bus retry output device; a bus cycle controller for suspending a currently executed bus cycle in response to the bus retry signal detected by said bus retry detection part, while retaining control of the bus cycle, and for re-starting the suspended bus cycle; and
    wherein the bus retry output device includes an interrupt detection part for determining whether or not another process request is issued during suspension of the bus cycle.

5. The system according to claim 4, wherein said microprocessor further includes:
    an interrupt controller for executing said another process detected by said interrupt detection part before re-starting the suspended bus cycle.

6. The system according to claim 4, wherein:
    said bus retry output device includes;
    a bus retry out part for outputting a bus retry signal; and
    the interrupt detection part includes
    an interrupt supervisory part for supervising another process request issued to said microprocessor; and
    a bus retry controller for outputting the bus retry signal to said bus retry output part in response to the process request detected by said interrupt supervisory part.

7. The system according to claim 6, wherein said bus retry output device further includes:
   a priority decision part for comparing a priority of the specified process with a priority of the currently executed bus cycle; and
   a bus retry controller outputting the bus retry signal when said priority decision part decides that the specified process takes priority over the currently executed bus cycle.

8. A system according to claim 4, wherein said another process has a priority and the currently executed bus cycle has a priority, and wherein:
   the interrupt detection part compares the priority of said another process with the priority of the currently executed bus cycle, and generates the bus retry signal when the priority of the another process is higher than the priority of the currently executed bus cycle.

9. A method of controlling a bus cycle comprising:
   a bus retry output step of outputting a bus retry signal to a microprocessor;
   a re-starting step of suspending a bus cycle currently executed by said microprocessor in response to the bus retry signal input to said microprocessor, while retaining control of the bus cycle, and then re-starting the suspended bus cycle; and
   an interrupt detection step of determining whether or not another process request is issued during suspension of the bus cycle.

10. The method of controlling a bus cycle according to claim 9, wherein said re-starting step includes a step of executing said another process during suspension of the bus cycle.

11. The method of controlling a bus cycle according to claim 9, wherein said bus retry output step includes a step of comparing a priority of the specified process with a priority of the currently executed bus cycle so as to output the bus retry signal when said another process has higher priority.

12. A method according to claim 9, wherein said another process has a priority and the currently executed bus cycle has a priority, and wherein:
   the interrupt detection step includes the steps of comparing the priority of said another process with the priority of the currently executed bus cycle, and generating the bus retry signal when the priority of the another process is higher than the priority of the currently executed bus cycle.

* * * * *